United States Patent Office 3,150,752
Patented Sept. 29, 1964

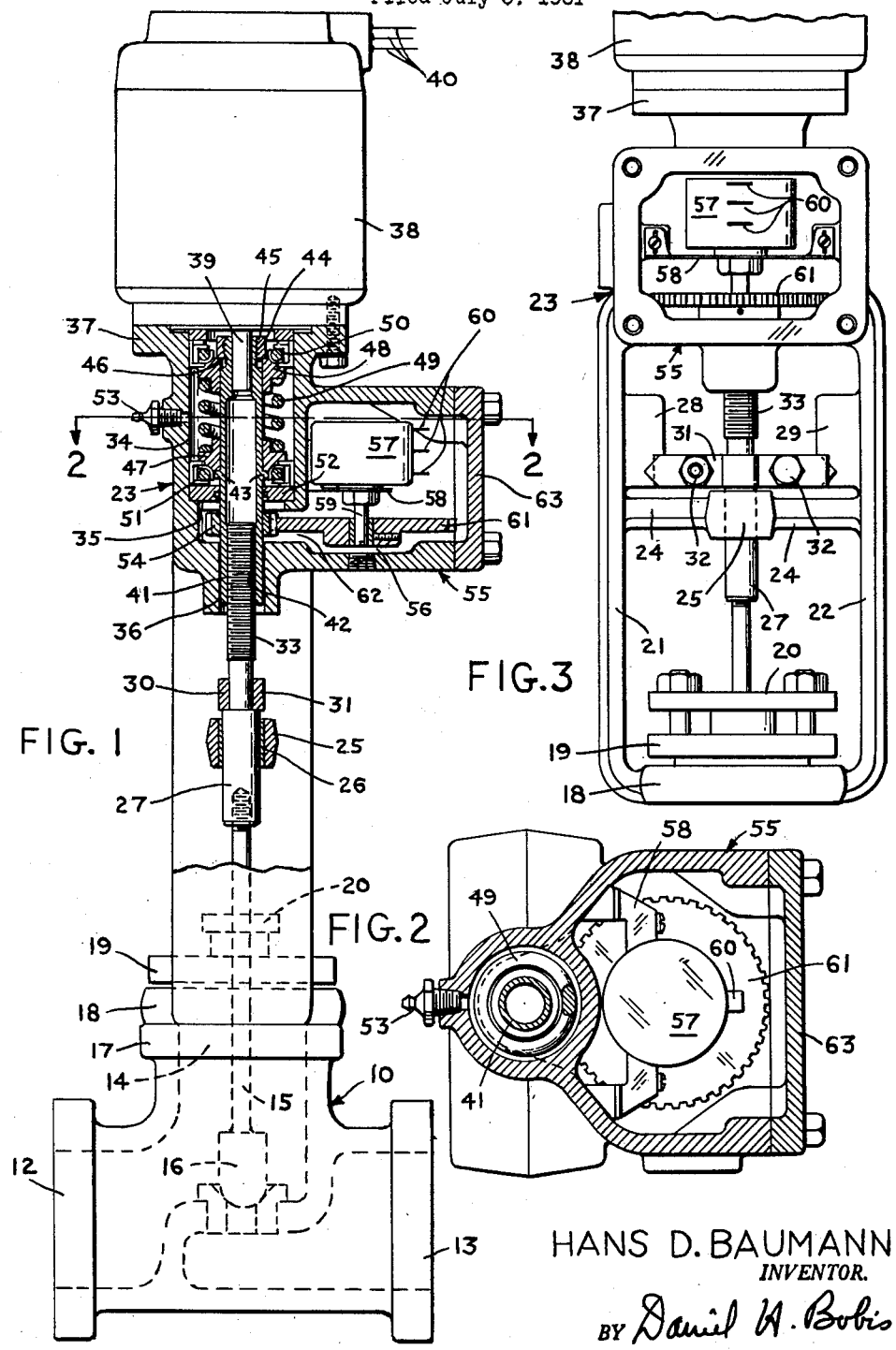

3,150,752
OVERRIDE DEVICE FOR VALVE ACTUATORS
Hans D. Baumann, Sharon, Mass., assignor to Worthington Corporation, Harrison, N.J., a corporation of Delaware
Filed July 3, 1961, Ser. No. 121,547
3 Claims. (Cl. 192—142)

This invention relates to valve actuators and more particularly to a stem travel limit override arrangement for valve actuators.

In the power actuation of valves, wherein a drive motor drives an actuating nut, which in turn reciprocates a valve stem to seat and unseat a valve plug, there is a substantial problem arising from the momentum of the drive rotor and the actuator gearing, in that even when the drive motor is de-energized by the controls, the valve stem will continue to advance a certain amount. This causes the valve plug to drive hard against the valve seat and the threads of the actuating nut to seize. Therefore, when a reversing signal is given to the motor, the motor is unable to operate and will stall, with serious strain on the valve parts and damage to the motor.

New developments in motor design have produced a permanent magnet rotor synchronous A.C. motor which operates at 72 r.p.m., and which will start or stop in less than 0.025 second and in less than 5° of shaft rotation, without electrical or mechanical braking. Therefore, while the momentum factor is reduced to a workable level, eliminating the need for braking, the valve override must be handled.

Further, in present day valve control circuits, it is desired to have switchless cancellation of the actuating signal. In one type of circuit commonly used, a sensing device in the system being controlled feeds a demand signal to the control circuit, of a given polarity according to the demand. The drive motor is reversible and will operate in a given direction depending upon the signal polarity. The valve actuator is provided with a variable potentiometer device which sends a feed-back signal according to the position of the potentiometer. Provision is made in the circuit for comparison of the demand signal with the feed-back signal, and when the error between the two becomes zero, the motor is de-energized. However, it is difficult to synchronize the seating of the valve plug with the exact point where zero error is reached. If the valve plug stopped before the said point of zero error, then motor stall would result with subsequent damage.

It is an object of the present invention, therefor, to provide a stem travel limit override arrangement whereby the drive rotor and gear assembly may be permitted to override without seizing of the nut threads and jamming of the actuating mechanism.

Still another object of the invention is to provide for sufficient override, so that even though the valve plug has seated, the valve control potentiometer may move to a position whereby zero in the comparative control signal and feed-back signal may be reached, de-energizing the drive motor in sufficient time to avoid a stall condition.

A further object of the invention is to provide a valve actuator which has elastic means to automatically compensate for thermal expansion of the valve stem.

Another object of the invention is to provide a valve actuator wherein the valve plug is subject to a spring biased closing force, the valve plug seating tightly on the valve seat when the motor is de-energized after the closing cycle of operation.

A further object of the invention is to provide a structure wherein during normal throttling operation the stem load is transmitted to the bearings and the preload of the coiled biasing spring being retained between stop means so that it never imposes a force upon the thrust bearing during any intermediate lift positions, and wherein when the valve plug is loaded in a given direction only one bearing is subjected to stem force, a second bearing floating freely permitting better alignment between stem and bearing axis, which together with reduced bearing load provide improved mechanical efficiency for the actuator.

Another object of the invention is to provide a limit override arrangement for valve actuators which is adaptable for down-seating or up-seating of the valve plug, without any change or adjustment for the actuator.

With the above and other objects in view, as will be presently apparent, the invention consists of the following assembly of parts shown in the several views, wherein—

FIGURE 1 is a side view, partly in longitudinal vertical section, showing the actuator of the present invention as applied to a valve of standard desgin;

FIGURE 2 is a transverse section taken on the line 2—2 of FIGURE 1; and

FIGURE 3 is a fragmentary end view of the actuator with the cover of the potentiometer housing removed therefrom.

In the drawings the reference numerals indicate like parts in the several views, and the reference numeral 10 indicates a valve housing of standard construction. The housing is provided with a valve seat 11, the fluid ports 12 and 13, and an opening 14 providing a passage for the valve stem 15 and valve plug 16. The opening 14 is provided with a mounting flange 17 which receives the base ring 18 of the actuator frame. A clamping nut 19 threadedly engages in the opening 14 and clamps the base ring 18 to the mounting flange 17. Suitable packing means, pressured by the packing plate 20, seals the stem as it passes through the clamping nut 19, while at the same time permitting it to reciprocate therein.

Projecting upwardly from the base ring 18 are the spaced, parallel, vertical frame members 21 and 22. These frame members support, terminate in and are preferably integrally formed with an upper housing 23. Intermediate the base ring 18 and the housing 23 are placed the inwardly directed arms 24, which support a hub 25 which in turn holds a slide bearing 26. The bearing guides a reciprocating actuator rod 27. The lower end of the rod 27 threadedly engages the upper end of the valve stem 15.

Above the arms 24 are formed the inwardly directed fins 28 and 29. At a point slightly above the hub 25, the guide bars 30 and 31 are clamped to the actuator rod 27 by the bolts 32. These guide bars 30 and 31 extend outwardly to overlap the fins 28 and 29, but are free to slide along the fins. This prevents the actuator rod 27 from rotating, but it is free to reciprocate. Suitable gauge marks on the fins 28 and 29 may be used to indicate the travel of the actuator rod.

The upper end of the actuator rod 27 has an elongated threaded portion 33 having a purpose which will shortly be described in greater detail.

The housing 23 is provided with a vertical bore which has an enlarged upper portion 34, a somewhat reduced intermediate portion 35 and a considerably reduced lower portion 36. The upper end of the housing, adjacent the enlarged upper portion of the bore, is provided with a mounting flange 37 which receives a drive motor 38, with the drive shaft 39 of the motor projecting downwardly into the enlarged upper portion of the bore. The motor is reversible, and has the usual electrical leads 40 for supplying energizing current.

In the vertical bore of the housing is positioned the elongated actuator nut 41. The nut is tubular and the lower end is provided with an interior threaded area 42, this area engaging with the threaded portion 33 of the actuator rod. The upper end of the nut 41 receives the shaft 39 of the motor, and the nut is keyed to the shaft 39 by a key (not shown) so that the nut receives torque from the shaft 39 but is slidable along the shaft.

At an intermediate point, the tubular nut 41 is provided with an integral stop shoulder 43. The upper end of the nut has a reduced threaded portion 44, which receives an adjustment nut 45. It is important to note that the nut 45 is larger in diameter than the actuator nut 41, thus defining an upper stop shoulder 46.

Between the lower stop shoulder 43 and the upper stop shoulder 46 are slidably positioned the spring buttons 47 and 48. These buttons are biased toward the stop shoulders 43 and 46 by a compression spring 49. It is to be noted that the buttons are free to slide inwardly, and the actuator nut may then move upwardly or downwardly if an axial force is directed against it.

The spring button 48 engages the inner race of an upper ball bearing 50, and the button 47 likewise engages the inner race of a lower ball bearing 51. It will be noted that these bearings are both radial and thrust bearings, so that the actuator nut may rotate freely within the bearings and receive axial thrust from both directions without friction loss. These bearings in effect serve as abutments in the bore, which enables the frame to accept the spring thrust in either direction.

A sealing disc 52 separates the upper portion 34 of the bore from the intermediate portion 35, making it possible to fill the upper portion 34 of the bore with grease from the grease nipple.

In the intermediate portion 35 of the bore is placed a gear 54, which is keyed (not shown) to the actuator nut 41 so as to rotate therewith.

At one side of the housing 23 is formed a housing extension 55. This housing extension defines a chamber 56 which houses a three turn potentiometer 57. The potentiometer is supported in the chamber 56 by a bracket 58. The potentiometer itself is of standard type, having a driven shaft 59 and electrical leads 60 which are connected to the control circuit for the actuator valve. The drive shaft 59 carries a gear 61 which is keyed for rotation therewith, and the gear 61 projects through an opening 62 connecting the intermediate portion 35 of the bore and the chamber 56, engaging the gear 54 and being driven thereby. The chamber 56 is provided with an end cover 63 which provides access to the potentiometer.

*Operation*

The valve actuator is mounted upon the valve 10 as shown, the motor 40 being connected to its energizing source and the leads 60 of the potentiometer being connected to the control circuit for the valve actuator. The adjustment nut 45 is adjusted on the reduced threaded portion 44 so that the compression spring 49 is under a preload equal to the design thrust of the actuator to take up any loose play between the spring buttons 47 and 48.

Since the load of the compression spring 49 is confined between the carefully adjusted spring buttons 47 and 48 which buttons in turn have a slight clearance between the respective buttons and the adjacent thrust bearings 50 and 51 during any intermediate lift positions of the valve stem, only the forces created by the fluid acting on the valve plug and the stuffing box friction are transmitted to the bearing. The preload does not affect the bearing until such time as the valve is sealed and the maximum actuating thrust exceeds the preload of the compression spring 49.

This construction thus in addition to better performance also contributes to reduction in bearing wear.

Furthermore any loads which do not exceed the design thrust of the actuator will fail to move the actuator nut 41 and will produce no change in the actuator nut; hence these changes in the valve stem and plug position will remain undetected by the potentiometer 57.

When the valve stem is in an intermediate position, therefore, the spring button 48 is in engagement with the upper stop shoulder 46, the spring button 47 is in engagement with the lower stop shoulder 43, and the actuator nut 41 is balanced between the bearings 50 and 51, being thereby centered for rotation when driven by the shaft 39 of the motor 40. The nut 41 will therefore rotate in fixed axial position unless substantial axial pressure is applied to the nut, sufficient to compress the spring 49.

Assume that the control circuit receives a demand signal from the sensing device for a closed valve. If the valve is already closed, the potentiometer 57 will be in such a position that the control circuit reads a zero error. The motor 40 will therefore not be energized. However, if the valve is open, the control circuit will read a value error, and the motor will be energized in the proper direction to cause a counter-clockwise rotation of the shaft 39. The actuator nut 41 will turn in a counter-clockwise direction, and because of the threaded engagement of the threaded area 42 of the nut and the elongated threaded portion 33 of the actuator rod 27, the rod will move downwardly in the bearing 26. Since the guide bars 30 and 31 prevent the rod 27 from rotating, the nut 41 must reciprocate the rod. The actuator rod 27 in turn moves the valve stem 15 downwardly, until the plug 16 is seated. As the plug 16 seats, an immediate upward axial force is directed to the actuator rod 27. This axial force is transmitted through the threaded connection to the nut 41, which starts to move upwardly. The stop shoulder 43 engages the spring button 47, which in turn causes the upper bearing abutment 50 to exert a back pressure to compress the spring 49. The upper end of the actuator nut 41 slides in the spring button 48 and also slides along the drive shaft 39 of the motor 38.

While the actuator nut 41 has been turning to perform the operation just described, the gear 54 has been turning the gear 61, which in turn has driven the shaft 59 of the potentiometer to move it toward its limit setting for a closed valve. The movement of the potentiometer changes its resistance, which changes its feed-back signal. A fraction of an instant after the valve 16 reaches its seat, the potentiometer has moved to a feed-back position wherein the error in the control circuit is zero. This de-energizes the motor 38 and the actuator nut stops. The slight additional override is taken up by further compression of the spring 49 and the potentiometer has been permitted to reach its position of zero error without stalling of the motor.

Assume that the control circuit now receives a demand signal for an open valve. A value error in the control circuit will energize the motor 38 in a reverse direction, causing clockwise rotation of the actuator nut 41. This will move the actuator rod 27 upwardly and lift the valve plug 16 upwardly, until the potentiometer reaches a pre-set position of zero error, whereupon the motor 38 will stop. If the plug 16 should reach any portion of the casing 10 which stops its upward travel before the motor is de-energized, the actuator rod 27 will stop and the nut 41 will be pulled downwardly. The upper stop shoulder 46 will compress the spring 49, thrusting the other end of the spring against the bearing abutment 51, and override will be permitted until the potentiometer reaches its zero error setting and the motor 38 is de-energized.

It will be noted that the override arrangement will work equally well if the plug 16 is an up-seating plug instead of a down-seating plug, and no change is required in the actuating structure.

While there has been herein shown and described the preferred embodiments of the invention, it is to be understood that minor changes may be made therein without departing from the scope of the invention as claimed.

What is claimed is:

1. In an actuator for use with a valve movable between open and closed positions, a supporting frame, a drive means adjacent said frame, an actuator assembly including a first member mounted in said frame, said first member being rotatably and slidably connected to said drive means, and a second member in threaded engagement with said first member, said second member being held against rotation whereby rotation of said first member will reciprocate said second member, said second member being adapted for engagement with a valve, control means actuated by one of said members for causing de-energization of said drive means when said second member has reached a desired first and second position, a pair of spaced abutments on said frame, a pair of spaced stop shoulders on one of said members, a resilient compression means on said one of said members positioned between said stop shoulders, said stop shoulders holding said compression means to a fixed, prestressed axial length, the spacing between said stop shoulders being such that said compression means is in light, balanced, rotary bearing engagement with said spaced abutments, during normal reciprocating movement of said actuator assembly, said resilient means permitting axial movement of said actuator assembly relative to said drive means in either direction when said second member is stopped from further movement, whereby jamming of said valve actuator is prevented.

2. In an actuator for use with a valve movable between open and closed positions, a supporting frame, a drive means adjacent said frame, an actuator assembly including a first member mounted in said frame, said first member being rotatably and slidably connected to said drive means, and a second member in threaded engagement with said first member, said second member being held against rotation whereby rotation of said first member will reciprocate said second member, said second member being adapted for engagement with a valve, control means actuated by one of said members for causing de-energization of said drive means when said second member has reached a desired first and second position, a pair of spaced abutments on said frame, a pair of spaced stop shoulders on one of said members, a resilient compression means on said one of said members positioned between said stop shoulders, one of said shoulders being axially movable whereby the prestressing of the compression means is closely adjustable, said one of said shoulders being adjusted so that said compression means at opposite ends is in light, balanced, rotary bearing engagement with said spaced abutments during normal reciprocating movement of said actuator assembly, said resilient means permitting axial movement of said actuator assembly relative to said drive means in either direction when said second member is stopped from further movement, whereby jamming of said valve actuator is prevented.

3. An actuator as set forth in claim 2, wherein the spaced abutments on said frame consist of combined radial and thrust anti-friction bearings.

References Cited in the file of this patent

UNITED STATES PATENTS

| | | |
|---|---|---|
| 916,831 | Bettinger | Mar. 30, 1909 |
| 2,407,537 | Chapman | Sept. 10, 1946 |
| 2,483,322 | Miller | Sept. 27, 1949 |
| 2,763,797 | Dean | Sept. 18, 1956 |